United States Patent
Hill et al.

(10) Patent No.: US 7,233,696 B2
(45) Date of Patent: Jun. 19, 2007

(54) APPARATUS AND METHOD FOR CHARACTERIZING DIGITAL IMAGES USING A TWO AXIS IMAGE SORTING TECHNIQUE

(76) Inventors: Richard K. Hill, 3481 Dayton-Xenia Rd., Beavercreek, OH (US) 45432; Herbert L. Hirsch, 3481 Dayton-Xenia Rd., Beavercreek, OH (US) 45432

(*) Notice: Subject to any disclaimer, the term of this patent is extended or adjusted under 35 U.S.C. 154(b) by 689 days.

(21) Appl. No.: 10/193,837

(22) Filed: Jul. 12, 2002

(65) Prior Publication Data

US 2004/0008892 A1      Jan. 15, 2004

(51) Int. Cl.
*G06K 9/00* (2006.01)

(52) U.S. Cl. .................................... 382/181
(58) Field of Classification Search ............... 382/305, 382/181
See application file for complete search history.

(56) References Cited

U.S. PATENT DOCUMENTS

| | | | |
|---|---|---|---|
| 4,779,095 A | 10/1988 | Guerreri | |
| 4,853,968 A * | 8/1989 | Berkin | 382/151 |
| 5,032,905 A | 7/1991 | Koga | |
| 5,614,960 A | 3/1997 | Chiba et al. | |
| 5,732,146 A | 3/1998 | Yamada et al. | |
| 5,751,378 A | 5/1998 | Chen et al. | |
| 5,809,171 A | 9/1998 | Neff et al. | |
| 5,864,372 A | 1/1999 | Chen et al. | |
| 5,982,930 A | 11/1999 | Neff et al. | |
| 5,982,945 A | 11/1999 | Neff et al. | |
| 6,049,363 A | 4/2000 | Courtney et al. | |
| 6,064,770 A | 5/2000 | Scarth et al. | |
| 6,088,483 A | 7/2000 | Nakano et al. | |
| 6,101,222 A | 8/2000 | Dorricott | |
| 6,104,836 A | 8/2000 | Buckley et al. | |
| 6,154,519 A | 11/2000 | Florent et al. | |
| 6,236,057 B1 * | 5/2001 | Shishido et al. | 250/559.45 |
| 6,239,878 B1 | 5/2001 | Goldberg | |
| 2003/0234960 A1 * | 12/2003 | Kaltenbach et al. | 358/3.24 |
| 2004/0098388 A1 * | 5/2004 | Roach et al. | 707/6 |
| 2005/0069207 A1 * | 3/2005 | Zakrzewski et al. | 382/190 |
| 2005/0220338 A1 * | 10/2005 | Qian et al. | 382/165 |

FOREIGN PATENT DOCUMENTS

JP      10-276435      10/1998

OTHER PUBLICATIONS

Hirsch, Herbert L., Statistical Signal Characterization, 1992, pp. 23-48, Artech House,□□Inc., Norwood.*

Beauchamp, Mike; "Corporate Capabilities Summary—Presentation Slides", ITRI Fall Information Workshop, Oct. 25, 2001.*

(Continued)

*Primary Examiner*—Jingge Wu
*Assistant Examiner*—Jordan Kuhn (57) ABSTRACT

An automatic digital image characterization system has a feature extractor, including a segment processor and a feature processor. The segment processor is connected for receiving an image in the form of digitized pixel values; each pixel value having an amplitude and being associated with positional information in the form of column and row values. The feature processor converts the image information into column and row axis functions having calculated values of statistical mean amplitude and standard deviation. A system processor registers images, senses image changes, locates objects and detects hidden information.

5 Claims, 6 Drawing Sheets

OTHER PUBLICATIONS

Hirsch; "Statistical Signal Characterization—New Help for Real-Time Processing", IEEE, 1992.*

Artemis Image Mining Tool Brochure, from MTL Systems.*

Hirsch; "Statistical Signal Characterization- New Help for Real-Time Processing", IEEE, 1992.*

Ablameyko and Pridmore, Machine Interpretation of Line Drawing Images, Springer Press 2000.

Anuta, Paul E., Digital Registration of Multispectral Video Imagery, SPIE Journal, vol. 7, 168-175 (Sep. 1969).

Hirsch, Herbert L., Statistical Signal Characterization, 1992, pp. 23-48, Artech House, Inc. Norwood.

Kou, Weidong, Digital Image Compression, Kluwer Academic Press, 1995.

Kurz and Benteftifa, Analysis of Variance in Statistical Image Processing, Cambridge University Press, 1997.

Russ, John C., The Image Processing Handbook, CRC Press, 2d edition 1995.

* cited by examiner

APPARATUS AND METHOD FOR CHARACTERIZING DIGITAL IMAGES USING A TWO AXIS IMAGE SORTING TECHNIQUE

BACKGROUND OF THE INVENTION

This invention relates to the characterization of digital images and, more particularly, to an apparatus and method for extraction of unique image features through use of statistical mathematics. Image characterization systems have long been used to determine unique features of image content, for many purposes, including image registration, image change detection, locating certain objects in images, and detecting hidden information in images. Unfortunately, such systems are slow and computationally-expensive, involving elaborate and complicated mathematical methods acting upon spatially or spectrally-derived image features. Prior art systems have evolved wherein the operator must have significant expertise in image science, and must manually adjust many parameters of the mathematical processes to achieve satisfactory image characterization for purposes such as those described above.

While prior art systems work acceptably well for certain image characterization applications, they suffer from several disadvantages including specialized operator expertise requirements, lack of effective automation, large demands upon processing resources, slow processing speeds, low-accuracy of registration, erroneous or ambiguous change detection, and erroneous or ambiguous object location, and are ineffective in reliably detecting hidden information in images.

SUMMARY OF THE INVENTION

The present invention provides an effective, statistics-based characterization technique which is computationally-simple, efficient, accurate, and fast-processing. The vertical and horizontal variations in an image are separated in order to enable the use of powerful signal processing techniques. Further, the present invention offers advantages over prior art, expert-enabled, manual systems by being usable by those not expert in image science and by being easily automated.

The invention uses an image characterization system comprising a Segment Processor coupled to an image source supplying a digital image or images to be characterized. The Segment Processor calculates sets of segment parameters of image rows and columns. The segment parameters are supplied to a Feature Processor which uses them for calculating axis functions of image rows and columns. Also included are means, coupled to the Feature Processor for performing image registration, change detection, object location, and hidden information detection.

Accordingly, it is a primary object of this invention to generate segment parameters and axis functions for efficient characterization of an image.

Other objects, features and advantages of the present invention will become apparent to those skilled in the art through the description of the preferred embodiment, claims, and drawings herein wherein like numerals refer to like elements.

DESCRIPTION OF THE PREFERRED EMBODIMENT

Figure 1:
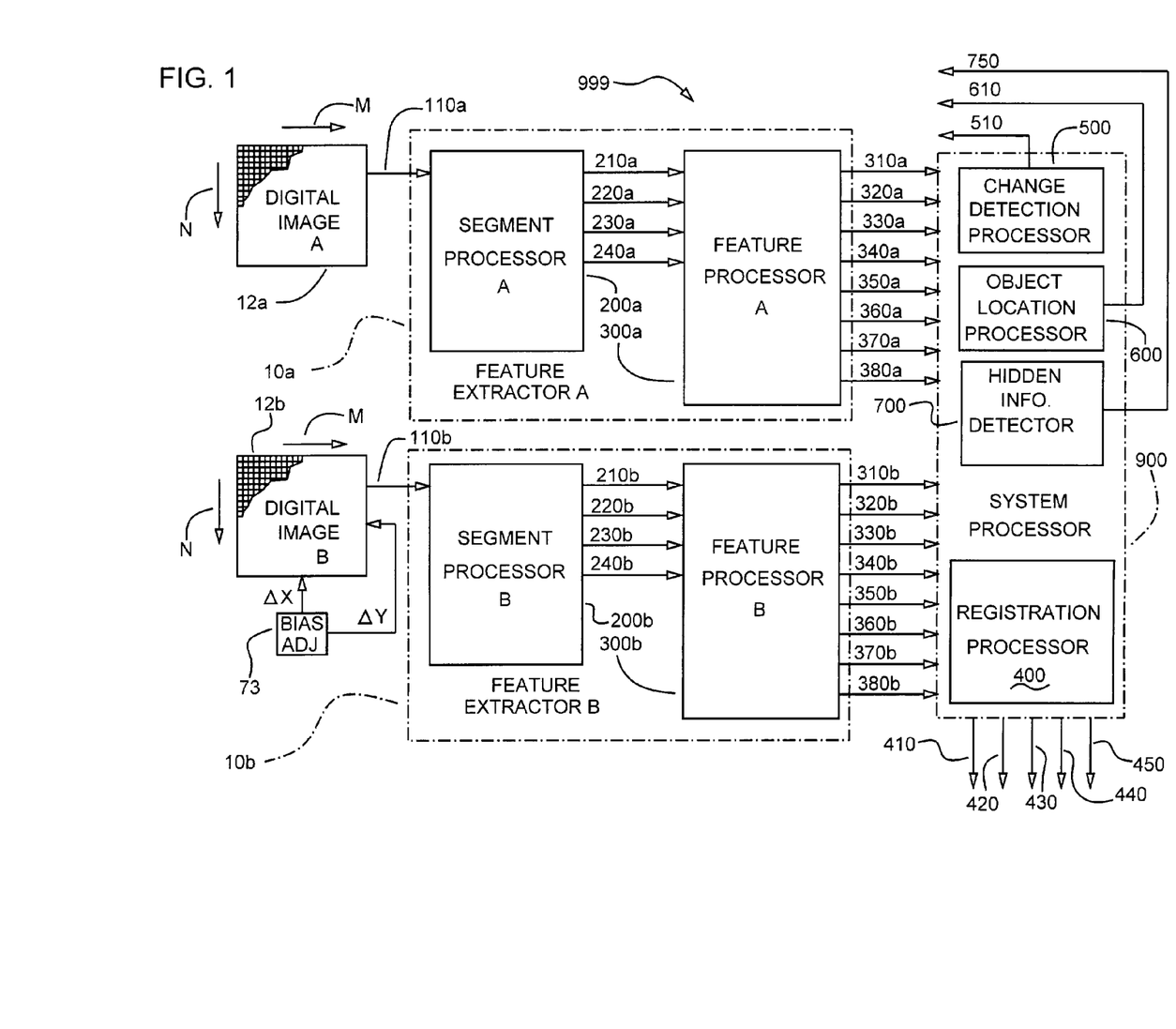
FIG. 1 is a block diagram of apparatus for registering or detecting changes between a pair of digital images, or for locating objects or detecting hidden information in images.

This invention provides an apparatus and a method for characterizing images. Viewed in the abstract, image characterization involves extraction of a quantifiable feature from the image. Upon quantification, the extracted feature can be used for identification of the overall image or something within the image. Most frequently, however, the interest in characterization arises from a desire to compare an unknown feature in a sample image with a known feature in a reference image. By way of example, FIG. 1 illustrates an image characterization system 999 comprising two feature extractors 10a and 10b operating in synchronism to extract a corresponding feature from a pair of images A and B, stored in image databases or stores 12a and 12b respectively. Images A and B each comprise digitized amplitude values for a two-dimensional array of image pixels organized into N rows and M columns, as generally illustrated in FIG. 1. These amplitude values are transmitted as data streams 110a, 110b to feature extractors 10a, 10b, respectively.

Figure 2:
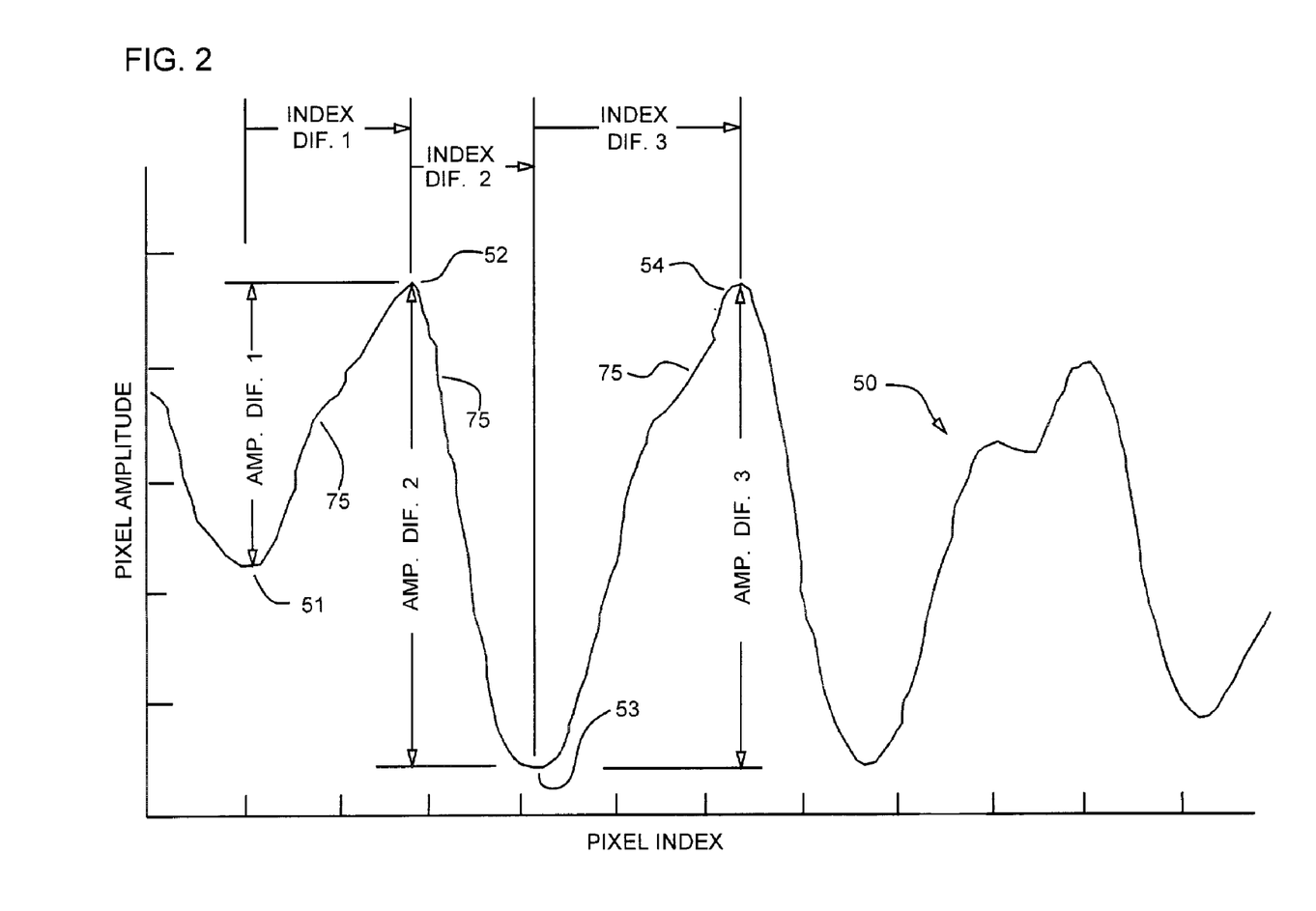
FIG. 2 is a sketch of typical image signal variations which may occur in either the "column" or the "row" of a digital image.

Data streams 110a, 110b are in digital format, having a series of amplitudes which may correspond to variations in an amplitude line 50 (See FIG. 2). Feature extractors 10a and 10b are of like construction, comprising Segment Processors 200a, 200b and Feature Processors 300a, 300b, as illustrated in FIG. 1. Segment Processors 200a, 200b receive amplitude values for all picture elements (pixels) in digital images A and B, indexed by row number and column number. The amplitude values may be produced by any digital processor (not illustrated) capable of storing digital image information and downloading it in a format compatible with feature extractors 10a, 10b.

Segment Processors 200a, 200b organize each column of pixel amplitudes, downloaded from image stores 12a, 12b, into an individual data series indexed by row number (1 to N), and determine each instance in each series where the amplitude data exhibits a local maximum or minimum. Segment Processors 200a, 200b also organize each row of pixel amplitudes downloaded from image stores 12a, 12b into an individual data series indexed by column number (1 to M), and determine each instance in each series where the amplitude data exhibits a local maximum or minimum.

By way of example, FIG. 2 illustrates amplitude values and index values for a sequence of pixels 50 arranged side-by-side in either a row or a column. The sequence 50 comprises a sequential series of segments 75 situated between pixel-pairs, such as pixel-pairs (51, 52), (52, 53) and (53, 54), located at consecutive amplitude maxima/minima. As used herein, the term "segment" means all of the pixels between two such consecutive maxima/minima in either a column or a row of a digital image A or B. Pixel amplitude values and index (period) values for N rows of pixels are carried on a segment-wise basis by data streams 220a and 220b. Pixel amplitude values and index values for M columns of pixels are carried on a segment-wise basis by data streams 210a and 210b Corresponding absolute differences in pixel index (period) values are carried on a segment-wise basis by data streams 240a, 240b, 230a and 230b. The Segment Processors 200a, 200b are able to collect their calculations to different levels of precision as an adjustable parameter. Table I summarizes the data streams generated by Segment Processors 200a, 200b.

TABLE I

| Data Stream | Data Type |
| --- | --- |
| 210a, 210b | Segment amplitude sets for M columns |
| 220a, 220b | Segment amplitude sets for N rows |
| 230a, 230b | Segment period sets for M columns |
| 240a, 240b | Segment period sets for N rows |

The data streams set forth in Table I are routed to Feature Processors 300a, 300b for generation of 16 data streams 310a, 310b, 320a, 320b 330a, 330b, 340a, 340b, 350a, 350b, 360a, 360b, 370a, 370b, 380a and, 380b. These streams carry function data as tabulated in Table II. Since these functions have row/column directionality, we refer to them as axis functions.

TABLE II

| Data Stream | Axis Function |
| --- | --- |
| 310a, 310b | Mean values of segment amplitude sets in data streams 210a, 210b |
| 320a, 320b | Standard Deviations for segment data sets of streams 210a, 210b |
| 330a, 330b | Mean values of segment period sets in data streams 220a, 220b |
| 340a, 340b | Standard Deviations for segment data sets of streams 220a, 220b |
| 350a, 350b | Mean values of segment amplitude sets in data streams 230a, 230b |
| 360a, 360b | Standard Deviations for segment data sets of streams 230a, 230b |
| 370a, 370b | Mean values of segment period sets in data streams 240a, 240b |
| 380a, 380b | Standard Deviations for segment period sets in streams 240a, 240b |

In accordance with the practice of this invention the image data incorporated into digital images A and B are characterized by reference to the mean values and the standard deviations, so determined. Mean values of segment amplitude sets and segment period sets may be calculated by Feature Processors 300a, 300b in the manner customary for reduction of statistical data. That is, a mean value of n observations is taken to be equal to the sum of the observation values divided by n. The standard deviations are determined by calculating the residuals (the differences between the observed values and the mean), squaring them, summing the squares, dividing the sum of the squares by the number of observations and calculating the square root of the quotient. The mean value and the standard deviations of n observed pixel amplitudes are calculated on a segment-wise basis so that new segments may be seamlessly appended to previously examined digital images A and B, while old image information is being simultaneously withdrawn from consideration. This permits the generation and comparison of new images on a continuous basis and minimizes data storage requirements. Additional details are provided below in connection with the description of Hidden Information Detector 700.

Still referring to FIG. 1, axis function data generated by Feature Processor 300a are carried as data streams 310a-380a, from feature extractor 10a to registration processor 400, where they are compared with axis function data carried as data streams 310b-380b from feature extractor 10b, thereby generating data streams 410, 420, 430, 440 and 450. These latter data streams carry function data as listed below in Table III.

TABLE III

| Data Stream | Function |
| --- | --- |
| 410 | Image A - Image B Rotation Error |
| 420 | Image A - Image B Column Translation Error |
| 430 | Image A - Image B Row Translation Error |
| 440 | Image A - Image B Column Scaling Error |
| 450 | Image A - Image B Row Scaling Error |

For ease of understanding, double reference to data streams 310a-380a and 310b-380b will be used only where necessary to distinguish between the processing of data for images A and B. Otherwise, this specification will make references more simply to appropriate ones of data streams 310-380, it being understood that references, for example, to data stream 310 will be taken to refer to either one of data streams 310a or 310b. A reference to data stream 320 will refer to either one of data streams 320a or 320b, etc. For further ease in understanding, we establish the following notations of Table IV for the axis functions carried by data streams 310, 320, 330, 340, 350, 360, 370 and 380:

TABLE IV

| | |
| --- | --- |
| $Ma(c, X) =$ | Column amplitude mean axis function for image X, where "c" denotes a particular column (data stream 310), |
| $Da(c, X) =$ | Column amplitude deviation axis function for image X, where "c" denotes a particular column (data stream 320), |
| $Mt(c, X) =$ | Column period mean axis function for image X, where "c" denotes a particular column (data stream 330), |
| $Dt(c, X) =$ | Column period deviation axis function for image X, where "c" denotes a particular column (data stream 340), |
| $Ma(r, X) =$ | Row amplitude mean axis function for image X, where "r" denotes a particular row (data stream 350), |
| $Da(r, X) =$ | Row amplitude deviation axis function for image X, where "r" denotes a particular row (data stream 360), |
| $Mt(r, X) =$ | Row period mean axis function for image X, where "r" denotes a particular row (data stream 370), |
| $Dt(r, X) =$ | Row period deviation axis function for image X, where "r" denotes a particular row (data stream 380). |

Thus, the column amplitude mean axis function series ($Ma(c, X)$) would include 200 values, for a 200-column image ($c=1$ through 200), the row period mean axis function ($Mt(r,X)$) series would include 100 values, for a 100-row image ($r=1$ through 100), and so forth.

Figures 3, 5:
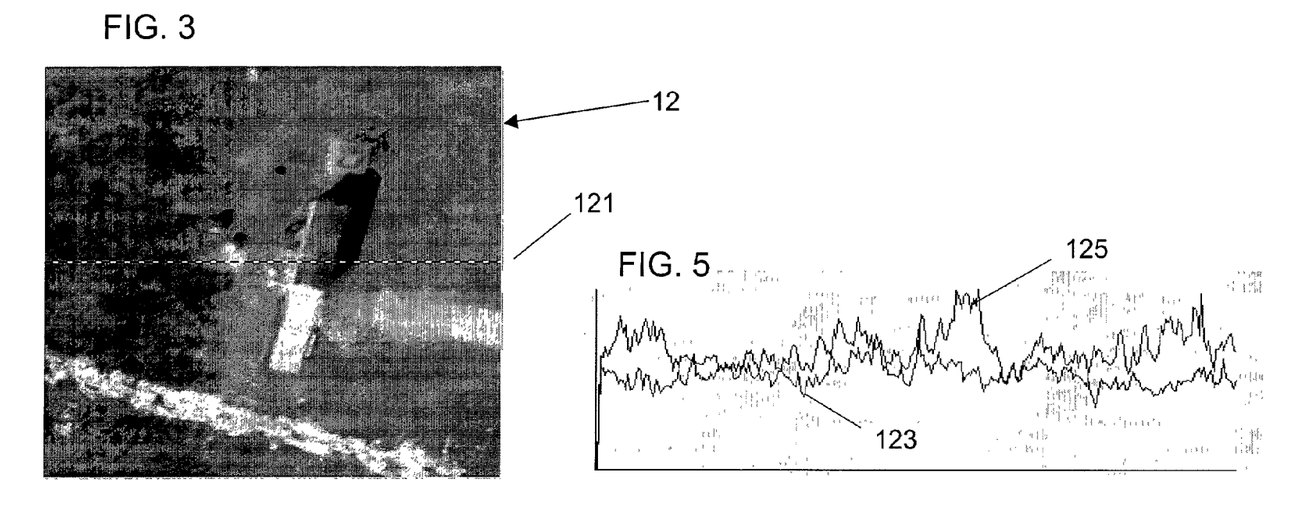
FIG. 3 illustrates a typical image which may be characterized in accordance with this invention.
FIG. 5 illustrates typical values for a Row Amplitude Mean Axis Function and for a Column Amplitude Mean Axis Function, both sets of values being plotted on the same graphical axis.
Figure 4:
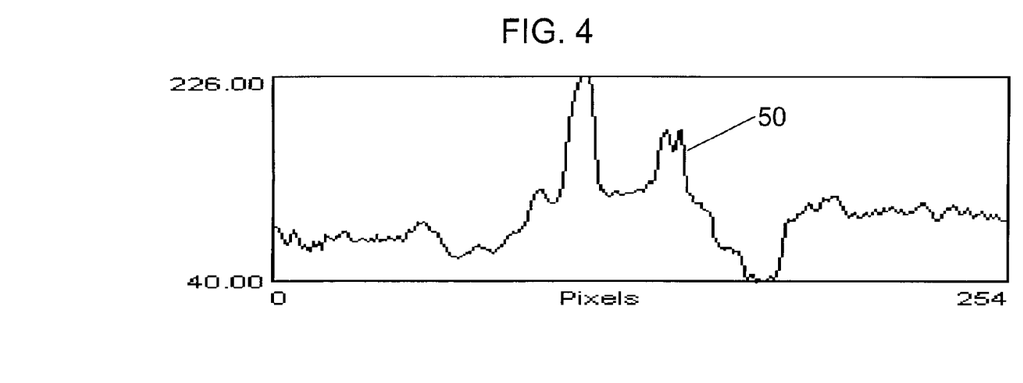
FIG. 4 illustrates typical image amplitude values for an entire row of pixels.

FIG. 3 illustrates a typical image 12 which may be characterized in accordance with this invention. Reference numeral 121 refers to a row of pixels having image amplitude values which may be downloaded in a data stream 110 to a Segment Processor 200. FIG. 4 illustrates typical image amplitude values for an entire row of pixels, as indicated by reference numeral 50 in FIGS. 4 and 2. FIG. 5 illustrates a series of values 123 for a corresponding Row Amplitude Mean Axis Function, Ma(r, X) and another series of values 125 for a Column Amplitude Mean Axis Function Ma(c, X).

Referring again to FIG. 1, the data streams 310*a*-380*a* and 310*b*-380*b* from Feature Processors 300*a*, 300*b* are applied to registration processor 400, which is functionally incorporated within a system processor 900. System processor 900 also comprises the Change Detection Processor 500, an Object Location Processor 600, and Hidden Information Detector 700. Registration Processor 400 calculates difference coefficients of three types, between like axis functions, from the two images (Image A and Image B). These coefficients are a Column Difference Coefficient, D(c), a Row Difference Coefficient, D(r), and an Aggregate Difference Coefficient, D. These difference coefficients are calculated as follows:

$$D(c)=[Ma(c,A)-Ma(c,B)][Da(c,A)-Da(c,B)][Mt(c,A)-Mt(c,B)][Dt(c,A)-Dt(c,B)] \quad \{\text{Equation 1}\}$$

$$D(r)=[Ma(r,A)-Ma(r,B)][Da(r,A)-Da(r,B)][Mt(r,A)-Mt(r,B)][Dt(r,A)-Dt(r,B)] \quad \{\text{Equation 2}\}$$

The invention contemplates four variations (V1-V4) of the difference coefficient calculations.

V1: Any or all quantities in brackets [ ] may be converted to absolute values.

V2: The Image A and Image B quantities for any or all axis functions may be interchanged, for example, [Ma(c,A)−Ma(c,B)] would become [Ma(c,B)−Ma(c,A)], and so forth.

V3: Any or all of the quantities in brackets [ ] may be replaced by a value of 1.0, eliminating that particular axis function from the calculation.

V4: Any or all of the axis functions may be replaced by a normalized version of that axis function, which is calculated by dividing each value in the axis function series by the average of all values in that series.

In a second embodiment of the invention the equations for calculating the column and Row Difference Coefficients may take the form:

$$D(c)=K1[Ma(c,A)-Ma(c,B)]+K2[Da(c,A)-Da(c,B)]+K3[Mt(c,A)-Mt(c,B)]=K4[Dt(c,A)-Dt(c,B)] \quad \{\text{Equation 3}\}$$

$$D(r)=K5[Ma(r,A)-Ma(r,B)]+K6[Da(r,A)-Da(r,B)]+K7[Mt(r,A)-Mt(r,B)]+K8[Dt(r,A)-Dt(r,B)] \quad \{\text{Equation 4}\}$$

Where the quantities (K1-K8) are weighting coefficients chosen to suit a particular application of the technique Again, there are four variations (V1-V4) on the mathematics, any or all of which may be applied, as follows:

V1: Any or all quantities in brackets [ ] may be converted to absolute values

V2: The Image A and Image B quantities for any or all axis functions may be interchanged, for example, [Ma(c,A)−Ma(c,B)] would become [Ma(c,B)−Ma(c,A)], and so forth V3: Any or all of the quantities in brackets[ ] may be replaced by a value of 0, eliminating that particular axis function from the calculation V4: Any or all of the axis functions may be replaced by a normalized version of that axis function, which is calculated by dividing each value in the axis function series by the average of all values in that series.

In a third embodiment of the invention the column and Row Difference Coefficients may be calculated by use of the relations:

$$D(c)=[Ma(c,A)/Ma(c,B)-1][Da(c,A)/Da(c,B)-1][Mt(c,A)/Mt(c,B)-1][Dt(c,A)/Dt(c,B)-1] \quad \{\text{Equation 5}\}$$

$$D(r)=[Ma(r,A)/Ma(r,B)-1][Da(r,A)/Da(r,B)-1][Mt(r,A)/Mt(r,B)-1][Dt(r,A)/Dt(r,B)-1] \quad \{\text{Equation 6}\}$$

Also, with this embodiment there are four variations (V1-V4) on the mathematics, any or all of which may be applied, as follows:

V1: Any or all quantities in brackets [ ] may be converted to absolute values

V2: The Image A and Image B quantities for any or all axis functions may be interchanged, for example, [Ma(c,A)/Ma(c,B)−1] would become [Ma(c,B)/Ma(c,A)−1], and so forth V2: Any or all of the quantities in brackets [ ] may be replaced by a value of 1.0, eliminating that particular axis function from the calculation V3: Any or all of the axis functions may be replaced by a normalized version of that axis function, which is calculated by dividing each value in the axis function series by the average of all values in that series In a fourth embodiment of the invention a weighted sum of quotients is used in the calculation of a Column Difference Coefficient and Row Difference Coefficient calculation for two images, A and B. In that embodiment the column and row Difference Coefficients take the form:

$$D(c)=K1[Ma(c,A)/Ma(c,B)-1]+K2[Da(c,A)/Da(c,B)-1]+K3[Mt(c,A)/Mt(c,B)-1]+K4[Dt(c,A)/Dt(c,B)-1] \quad \{\text{Equation 7}\}$$

$$D(r)=K5[Ma(r,A)/Ma(r,B)-1]+K6[Da(r,A)/Da(r,B)-1]+K7[Mt(r,A)/Mt(r,B)-1]+K8[Dt(r,A)/Dt(r,B)-1] \quad \{\text{Equation 8}\}$$

Where the quantities (K1-K8) are weighting coefficients chosen to suit a particular application of the technique Four variations (V1-V4) of this embodiment are:

V1: Any or all quantities in brackets [ ] may be converted to absolute values

V2: The Image A and Image B quantities for any or all axis functions may be interchanged, for example, [Ma(c,A)/Ma(c,B)−1] would become [Ma(c,B)/Ma(c,A)−1], and so forth V3: Any or all of the quantities in brackets [ ] may be replaced by a value of 0, eliminating that particular axis function from the calculation V4: Any or all of the axis functions may be replaced by a normalized version of that axis function, which is calculated by dividing each value in the axis function series by the average of all values in that series A fifth embodiment of the invention calculates the column and Row Difference Coefficients by the equations:

$$D(c)=[Ma(c,A)Da(c,A)Mt(c,A)Dt(c,A)-Ma(c,B)Da(c,B)Mt(c,B)Dt(c,B)] \quad \{\text{Equation 9}\}$$

$$D(r)=[Ma(r,A)Da(r,A)Mt(r,A)Dt(r,A)-Ma(r,B)Da(r,B)Mt(r,B)Dt(r,B)] \quad \{\text{Equation 10}\}$$

And it may be practiced in any of four variations (V1-V4) as follows:

V1: Any or all quantities in brackets [ ] may be converted to absolute values

V2: The Image A and Image B quantities for any or all axis functions may be interchanged, for example, Ma(c,A) and Ma(c,B) would appear on opposite sides of the subtraction than their present location in the equation V3: Any or all of the quantities in brackets [ ] may be replaced by a value of 1.0, eliminating that particular axis function from the calculation V4 Any or all of the axis functions may be replaced by a normalized version of that axis function, which is calculated by dividing each value in the axis function series by the average of all values in that series A sixth embodiment of the invention uses correlation functions to calculate column and Row Difference Coefficients for two images, A and B:

$$D(c) = Correl(Ma(c,A), Ma(c,B)) \quad \{\text{Equation 11}\}$$

$$D(r) = Correl(Ma(r,A), Ma(r,B)) \quad \{\text{Equation 12}\}$$

Where $$Correl(S1, S2) = [Sum((S1i - Mean(S1i))(S2i - Mean(S2i)))]/n/Sigma(S1)/Sigma(s2),$$

Sigma(S) = Standard Deviation of series S

It will be appreciated that other column axis functions, such as those carried by data streams 320, 330, or 340 may be substituted for column mean amplitude Similarly, other row axis functions may be substituted for row mean amplitude. Arithmetic and multiplicative combinations of the axis functions may also be employed.

The Aggregate Difference Coefficient may be established in numerous ways. By way of example, four different methods will now be described.

First Method (uses only column data)

$$D = D(c) \quad \{\text{Equation 13}\}$$

Second Method (uses only row data)

$$D = D(r) \quad \{\text{Equation 14}\}$$

Third Method (uses only product data)

$$D = D(c)D(r) \quad \{\text{Equation 15}\}$$

Fourth Method (weighted sum)

$$D = K1 D(c) + K2 D(r) \quad \{\text{Equation 16}\}$$

Where the quantities (K1, K2) are weighting coefficients which are selected by the user.

The particular method for calculating the Row Difference Coefficient, the Column Difference Coefficient and the Aggregate Difference Coefficient, and the configuration of variations used within the particular method are user-selectable and will vary based on the nature of the imagery being used, and the purpose of the difference coefficients in subsequent processing (such as described below).

The registration processor 400 uses any or all of the difference coefficients as an Image A-Image B rotation error. Selection of a difference coefficient is application-dependent, and may be affected by the type of image involved. For example, it has been observed that the effect of a rotation error tends to be minimized when applied at the point of rotational alignment (registration) between the two images.

The registration processor 400 uses the Column Difference Coefficient for correcting an image column translation error and uses the Row Difference Coefficient for correcting an image row translation error. In a typical application, the translation error minimizes at the point of translational alignment (registration) between the two images, along the row or column axes.

The registration processor 400 uses the Column Difference Coefficient for correcting an image column scaling error and uses the Row Difference Coefficient for correcting an image row scaling error. In a typical application, the column and row scaling errors are proportional to the scaling ratios between the two images in directions along the column and row axes. In a typical application the numerical values of the image rotation, translation or scaling errors can be used as a guide in the selection of difference coefficients.

Still referring to FIG. 1, image A and image B may be images of substantially the same thing, observed in different spectra (e.g., visible and near-IR). It may be assumed that these two images are to be registered. This enables, among other things, a comparison of the similarities and/or differences, between the images A and B. Feature Processor 300a provides column amplitude mean axis functions and row amplitude mean axis functions for both images. Registration processor 400 uses Equations 1 and 2 above to calculate a Column Difference Coefficient and a Row Difference Coefficient for the two images. Data for performing and updating those calculations are supplied by data streams 310a-380a and by data streams 310b-380b.

Registration processor 400 uses Equation 15 to calculate the Aggregate Difference Coefficient for the two images. In the preferred embodiment, one of the image stores 12a or 12b has a bias adjuster 73 which may be operated either manually or automatically to make a desired adjustment, $\Delta X$, to the column address of its associated image and a desired adjustment $\Delta Y$ to the row address thereof. These address adjustments enable intentional offsetting of image B relative to image A, so as to compensate for unavoidable registration errors therebetween. In operation, bias adjuster 73 is manipulated to produce values $\Delta X$ and $\Delta Y$ which minimize the difference coefficients calculated by registration processor 400.

It will be appreciated that image difference coefficients, as described above, may be used for characterizing features other than misregistration of two similar images. For example system processor 900 may include a change detection processor 500 for processing images of a scene and detecting changes which have occurred over the course of time. This would be useful in detecting the movement of targets in a battlefield environment, for example. Change detection processor 500 may be implemented in either hardware or software. Preferably change detection processor 500 is a software module configured for being called by an executive program loaded within system processor 900. It may be linked to another similar software module functioning as registration processor 400 and may process the axis functions generated by feature extractors 10a, 10b for characterizing image A and image B.

Change detection processor 500 generates a Column Difference Coefficient, a Row Difference Coefficient and an Aggregate Difference Coefficient which measure differences between like axis functions of the two images. The difference coefficient processing here is identical to that which was described for the registration processing and need not be repeated. The particular means for calculating the Column Difference Coefficient, the Row Difference Coefficient and the Aggregate Difference Coefficient, and the configuration of variations used within the particular means, are user-selectable and will vary based on the nature of the imagery being used, and the purpose of the difference coefficients in subsequent processing. Change detection processor 500 uses any or all of the difference coefficients as an object change coefficient, the value of which is output as data stream 510. In a typical application the numerical value of the change coefficient indicates the magnitude and type of changes between Image A and Image B. Different combinations of means for calculating the Column Difference Coefficient, the Row Difference Coefficient and the Aggregate Difference Coefficient, may be used to tailor the process to detect different types of changes.

Figure 6:
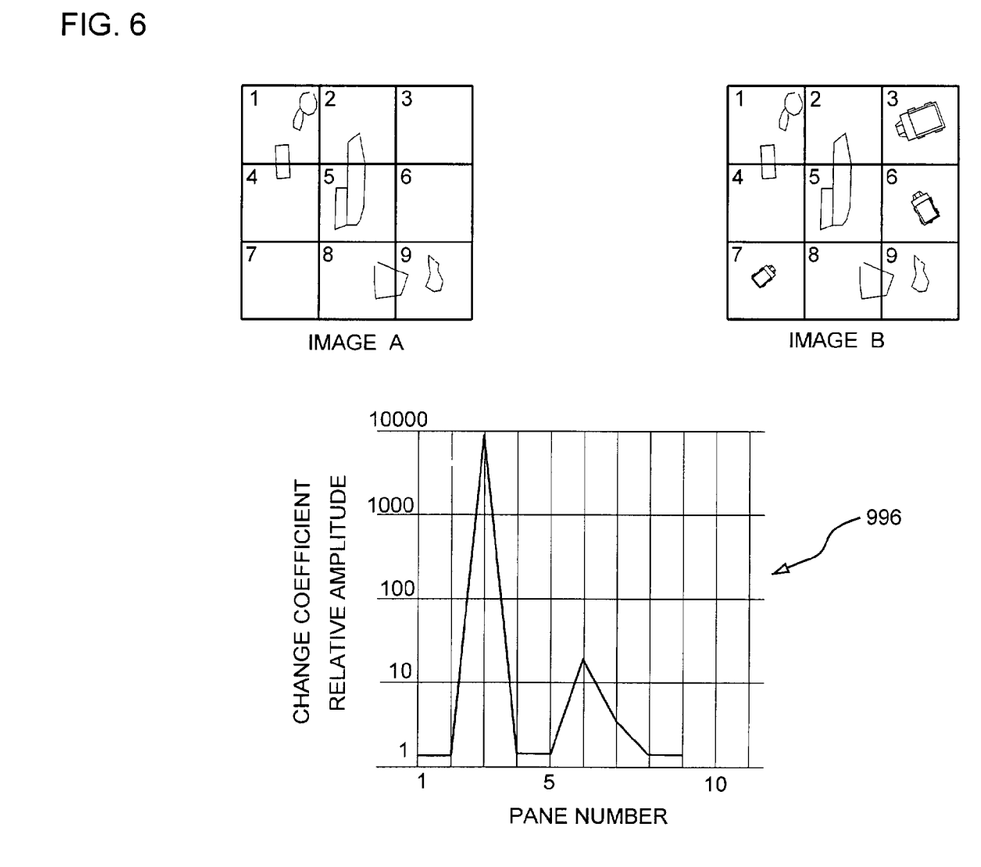
FIG. 6 illustrates the effect of target objects upon a change coefficient generated for an image including a plurality of such targets.

FIG. 6 illustrates example imagery and data for a change detection application. The figure shows two images labeled Image A and Image B. These images are arbitrarily divided into nine panes for the purpose of this example, to identify areas of change. Pane nos. 1, 2, 4, 5, 8 and 9 are the same in both images. It should be understood that more or fewer panes could be used. However panes 3, 6 and 7 are different. Truck-like objects have been introduced into panes 3, 6 and 7 of Image B. No such objects are present in Image A in either of panes 3, 6 or 7. Feature Processors 300a, 300b provide column and row axis function information to data streams 310, 320, 330, 340, 350, 360, 370, 380 for all panes of both images. Change detection processor 500 uses Equation 1 and Equation 2 (products of differences, as defined above) to calculate a Column Difference Coefficient, D(c), and Row Difference Coefficient, D(r), for all pairs of like-numbered panes from the two images. After those calculations have been made, change detection processor 500 uses Equation 15 (product of Column Difference Coefficient and Row Difference Coefficient) to calculate aggregate difference coefficients for all nine pane-pairs. The resulting aggregate difference coefficients are transferred to data stream 510 of FIG. 1, from which a data plot 996 of FIG. 6 may be created. As illustrated therein, the change coefficient exceeds a threshold value (set at 1.0 in this example) for panes 3, 6 and 7.

It will be understood that the data in streams 110a, 110b must be preprocessed for compatibility with the nine-pane, 3×3 format. This may be accomplished in many different ways. For example, image data for each image could be stored in data stores 12a, 12b as 2048 data bytes, each 32 bits wide. Image information then could be transferred from data stores 12a, 12b to data streams 110a, 110b as a series of 30-bit data bytes, so that each pane would comprise 100 pixels of image information, arranged in a 10×10 matrix, and each data byte would characterize three vertically arranged pixel columns, one column from each of three different panes. Many other feasible pixel arrangements will be readily apparent.

The object location processor 600 calculates a Column Difference Coefficient, D(c), a Row Difference Coefficient, D(r), and an Aggregate Difference Coefficient, D, between like-axis functions carried by streams 310, 320, 330, 340, 350, 360, 370 and 380 and the two images stored in image stores 12a and 12b. The calculation procedure is substantially identical to the procedure which is described above for registration processing by registration processor 400, with the exception of the method employing a correlation function. No further description thereof is necessary. Object location processor 600 uses any or all of the three resulting image difference coefficients as an object location coefficient, which is output as data stream 610. In a typical application the numerical value of the object location coefficient indicates the presence or absence of the object of the search in the searched image, where higher values for the object location coefficient indicate higher likelihoods that the object of the search exists in the searched image.

Figure 7:
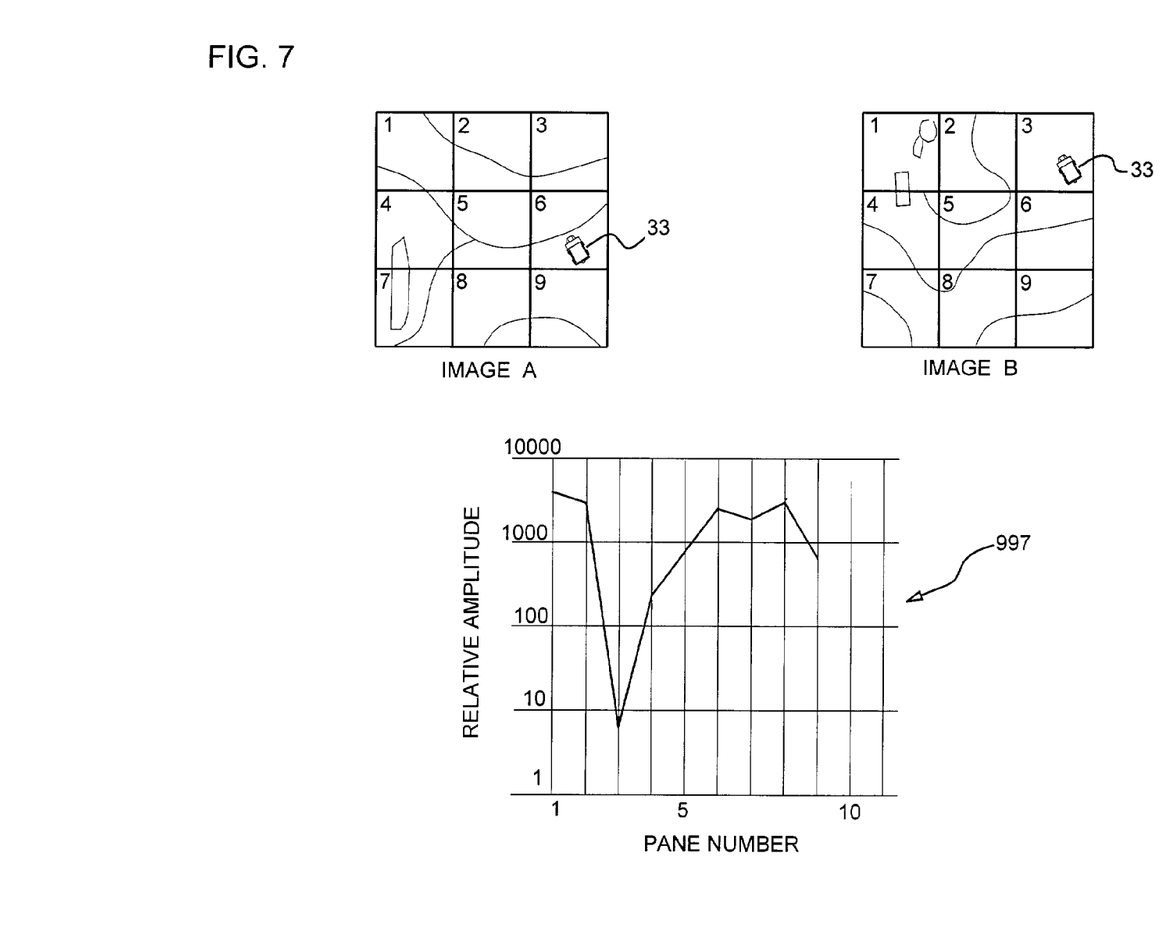
FIG. 7 illustrates the effect produced upon an object location coefficient by moving a target object from one image pane to another.

Reference is now made to FIG. 7., which shows example imagery and data for an object location application. Image A contains a source object 33. Image B is an image of an area suspected to harbor a similar object. It is assumed that Image B to be searched to locate the object of Image A. For the purposes of this example, each of these images are divided into nine panes in a 3×3 arrangement. The source object appears in pane 6 of Image A and in pane 3 of Image B. Feature Processors 300a, 300b provide all column and row axis functions of Table I to object location processor 600 via data streams 310, 320, 330, 340, 350, 360, 370, 380 for pane 6 of Image A and for each pane of Image B. Object location processor 600 uses a product-of-differences calculation (Equation 1) to determine a Column Difference Coefficient D(c) and a second product-of-differences calculation (Equation 2) to determine a Row Difference Coefficient D(r). These column and Row Difference Coefficients are used in Equation 15 to determine Aggregate difference coefficients, D, for pane 6 of Image A and all 9 panes of Image B. Graph 997 of FIG. 7 plots the relative amplitude of the Aggregate Difference Coefficient calculated for Image A, pane 6 and each of the panes of Image B. This produces nine object location coefficients which are output in a data stream 610 of FIG. 1. The plot minimizes below a threshold value (set at 15.0 in this example) for pane 3. This indicates the source object from pane 6 of Image A was found in pane 3 of Image B.

It has been found that a system processor 900, provided with a hidden information detector 700, connected as illustrated in FIG. 1, is able to detect hidden information, such as, for instance, a watermark in the principal image. A suitable program 800 appears in FIG. 8 which will now be described.

Figure 8:
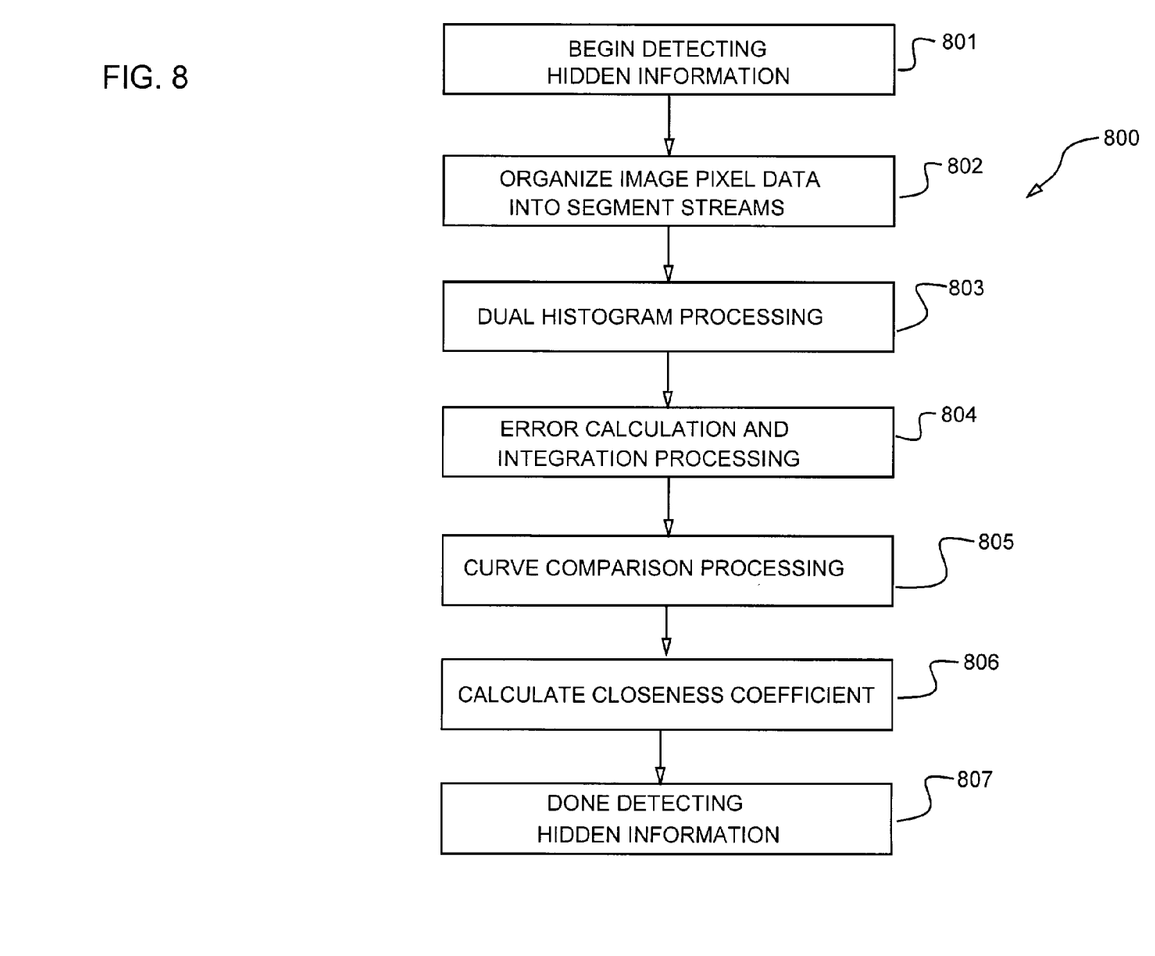
FIG. 8 is a flow chart illustrating the detection of hidden information in accordance with the invention.

Program 800 begins at step 801 and concludes at step 807. After program 800 has been initiated, it organizes the relevant image pixel data into segment streams (step 802). That involves the manipulation of a data stream 110 to generate streams such those produced by segment processors 200a, 200b. In fact, hidden information detector 700 could perform step 802 by simply reading the output signals from a segment processor 200, thereby avoiding the need to perform the calculations described above in connection with the discussion of FIG. 2.

Next, the computer performs step 803 where it calculates histogram representations (step 803) of any or all of the following data sets: (a) the column segment amplitudes, (b) the row segment amplitudes, (c) the column segment periods or (d) the row segment periods, at a user-selectable precision, for all rows and all columns in the image to be evaluated. Histograms may be used individually or their data may be combined. For example, the row segment amplitudes and column segment amplitudes may contribute to one histogram or two individual ones. We establish the following notation for associated histogram bin values:

$B_1, B_2, \ldots B_n,$

Where: $B_1$=the number of column segment amplitudes, row segment amplitudes, column segment periods or row segment periods whose value is 1

$B_2$=the number of column segment amplitudes, row segment amplitudes, column segment periods or row segment periods whose value is 2

$B_n$=the number of column segment amplitudes, row segment amplitudes, column segment periods or row segment periods whose value is n, and n is the highest possible value in the data set.

For example, consider a column or row segment amplitude histogram at a precision of 4 for an 8-bit digital image (whose segment amplitudes must be no less than 1 and no greater than 255). In this example, n would be 255 and the set of bin values would be $B_1$, through $B_{255}$ A precision of 4 means that all values are rounded up to the nearest integer multiple of 4 (1.3=4.0, 2.8=4.0, 4.7=8.0, 7.3=8.0, and so forth), and the number of amplitudes at each integer multiple of 4 are recorded as the contents of a histogram bin designated by that integer ($B_4$, $B_8$, etc.). At this precision setting of 4, only bins whose index is an integer multiple of 4 ($B_4$, $B_8$, etc.) will have values, and the rest (such as $B_1$, $B_2$, $B_3$, $B_5$, etc.) will be zero. This set of histogram values, at the selected precision setting is called the Theoretical Estimate of Fullness and Smoothness (TEFS). Other precision settings (i.e., other than 4) may be more optimal for certain image types or hidden information, and the precision setting of 4 discussed above is given for example's sake.

Similarly, program 800 calculates additional histogram representations for any or all of the column segment amplitudes, the row segment amplitudes, the column segment periods and the row segment periods, at a precision setting of 1. Histograms may be used individually or their data may be combined. For example, the row segment amplitudes and column segment amplitudes may contribute to one histogram or two individual ones. We establish the following notation for these histogram bin values:

$B'_1, B'_2, \ldots B'_n$,

Where: $B'_1$=the number of column segment amplitudes, row segment amplitudes, column segment periods or row segment periods whose value is 1

$B'_2$=the number of column segment amplitudes, row segment amplitudes, column segment periods or row segment periods whose value is 2

$B'_n$=the number of column segment amplitudes, row segment amplitudes column segment periods or row segment periods whose value is n, and n is the highest possible value in the data set.

For example, consider a segment amplitude histogram at a precision of 1 for an 8-bit digital image (whose segment amplitudes must be no less than 1 and no greater than 255). $B'_1$ is the histogram bin containing the number of segments whose value is 1, $B'_2$ is the histogram bin containing the number of segments whose value is 2, and so forth. Program 800 then calculates sums of all the bin values of this precision-level-1 histogram into bins corresponding to the TEFS bins which contain non-zero values. This set of histogram values is called the Measure of Fullness and Smoothness (MOFS). We establish the following notation for the MOFS bin values:

$$B''_{x_i} = \sum_{i=x-p+1}^{x} B_1$$

Where: P=the precision of the TEFS histogram

For example, for a TEFS histogram with a precision of 4, the series of bins for the MOFS histogram would be:

$B''_4, B''_8$, etc. (a $B''_x$ value for every $B_x$ value in the TEFS histogram)

Where:

$B''_4 = B'_1 + B'_2 + B'_3 + B'_4$, $B''_8 = B'_5 + B'_6 + B'_7 + B'_8$, and so forth.

Next, for each non-zero populated value ($B_x$, X=4, 8, etc.) of the TEFS set, program 800 performs the following error (E) calculation, which determines the absolute difference between the quotient of the MOFS and TEFS bin values and a value of 1.0 for each bin value occurrence:

$E_x = |1.0 - B''_x / B_x|$

Program 800 may, optionally, normalize each error value, $E_x$. Whether or not normalization is done is selected by the user based on the type of imagery or hidden information being addressed by the technique. Program 800 normalizes each error value, $E_x$ by multiplying it by the ratio of the sum of the TEFS set to the sum of the MOFS set:

$$E_{x,n}(\text{Normalized}) = \frac{\sum_{i=1}^{x} B_i}{\sum_{i=1}^{x} B''_i}$$

The program 800 then integrates (accumulates the sum) of the error values (normalized or not) as a difference integral curve, D, whose values ($D_x$) are:

$$D_x = \sum_{i=1}^{x} E_i$$

(errors not normalized) or $$D_x = \sum_{i=1}^{x} E_{i,n}$$

(errors normalized)

Program 800 may create difference integral curves using any or all of the following data sets: (a) the column segment amplitudes, (b) the row segment amplitudes, (c) the column segment periods or (d) the row segment periods, using the processing described above.

Program 800 then compares the aforementioned difference integral curves to expected difference integral curves for images with hidden information. This produces a Closeness Coefficient (step 806) which is a measure of the difference between the difference integral curves for the digital image being interrogated and the expected integral curve. The Closeness Coefficient may be calculated using any curve comparison technique considered good engineering practice. For example:

1. Differences between corresponding values for the two curves could be calculated then summed (difference technique).
2. Differences between corresponding values for the two curves could be calculated, and their absolute values summed (absolute difference technique).
3. Differences between corresponding values for the two curves could be calculated then squared, the squares summed, and the square root of the sum calculated (least-squares technique).
4. Quotients of corresponding values for the two curves could be calculated then summed (quotient technique).
5. The amount of scaling of the expected integral curve required to achieve the best fit to the difference integral curve could be recorded.

In typical application the numerical values of the Closeness Coefficient would indicate the presence or absence of hidden information in the image being interrogated. The typical application may be an analysis of two images, one of which is watermarked, (containing hidden information—the watermark) and the other which is unwatermarked (containing no hidden information); the images being otherwise identical. It is practical, using this invention, to apply dual histogram processing to obtain a combined histogram at a precision setting of 1 for the watermarked and unwatermarked images. The dual histogram processing may use combined column segment amplitudes and row segment amplitudes to create a TEFS histogram at a precision setting of 4, for both the watermarked and unwatermarked images. The dual histogram process may use combined column segment amplitudes and row segment amplitudes to create a histogram at a precision setting of 1 and then combining bin data for every four consecutive bins to create a MOFS histogram at a precision setting of 4 (corresponding to that of the TEFS histogram) for both the watermarked and unwatermarked images.

The process of detecting hidden information in a watermarked image may conclude with the production of error integral curves and then calculation of Closeness Coefficients for the watermarked and unwatermarked data. In an actual application of this example watermarked and unwatermarked images were successfully separated, using a threshold of 0.15; Closeness Coefficients below this threshold indicating the presence of hidden information.

While the forms of apparatus and the methods of operation herein described constitute preferred embodiments of this invention, it is to be understood that the invention is not limited to these precise embodiments, and that changes may be made therein without departing from the scope of the invention which is defined in the appended claims.

What is claimed is:

1. A method of characterizing an M-column by N-row array of image pixels, said method comprising:
    (1) reading the amplitudes of said pixels;
    (2) assigning column and row indices to said amplitudes;
    (3) organizing said amplitudes into segment amplitude sets for M columns and N rows;
    (4) organizing segment period sets for M columns and N rows
    (5) calculating mean value sets for said segment amplitude sets;
    (6) calculating standard deviation sets for said mean value sets;
    (7) using said mean value sets and said standard deviation sets to characterize said array of image pixels, and
    (8) determining registration errors through calculation of difference coefficients d(c) and d(r) defined by the following equations:

$$D(c)=[Ma(c,A)-Ma(c,B)][Da(c,A)-Da(c,B)][Mt(c,A)-Mt(c,B)][Dt(c,A)-Dt(c,B)]$$

$$D(r)=[Ma(r,A)-Ma(r,B)][Da(r,A)-Da(r,B)][Mt(r,A)-Mt(r,B)][Dt(r,A)-Dt(r,B)]$$

where: $Ma(c,X)$=column amplitude mean axis function for image X, where "c" denotes a particular column
    $Da(c,X)$=column amplitude deviation axis function for image X, where "c" denotes a particular column
    $Mt(c,X)$=column period mean axis function for image X, where "c" denotes a particular column
    $Dt(c,X)$=column period deviation axis function for image X, where "c" denotes a particular column
    $Ma(r,X)$=row amplitude mean axis function for image X, where "r" denotes a particular row,
    $Da(r,X)$=row amplitude deviation axis function for image X, where "r" denotes a particular row,
    $Mt(r,X)$=row period mean axis function for image X, where "r" denotes a particular row,
    $Dt(r,X)$=row period deviation axis function for image X, where "r" denotes a particular row.

2. The method of claim 1 wherein the quantities in at least one of said bracketed expressions are converted to absolute values.

3. The method of claim 1 wherein the image A and image B quantities of at least one of said axis functions are interchanged.

4. The method of claim 1 wherein at least one of said bracketed quantities has a value of zero.

5. The method of claim 1 wherein at least one of said axis functions is replaced by a normalized version thereof.

* * * * *